Dec. 11, 1934.   L. H. MORIN ET AL   1,983,558
METHOD OF MOLDING OR DIE CASTING PREDETERMINED ARTICLES OF MANUFACTURE
Filed Dec. 7, 1933
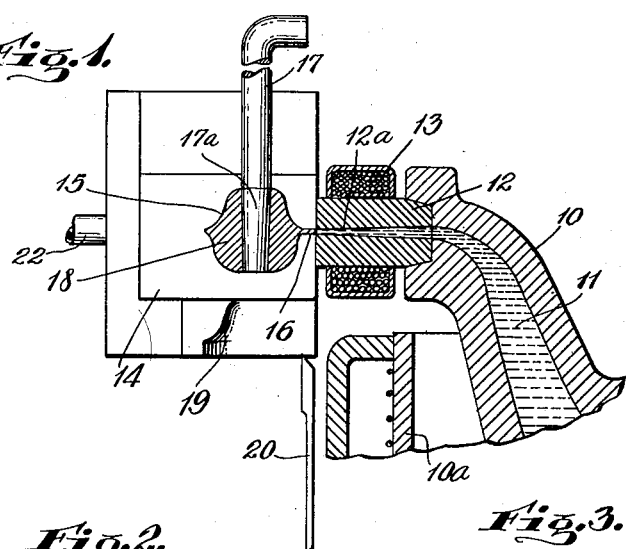
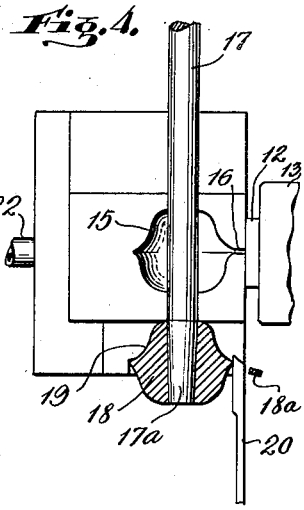
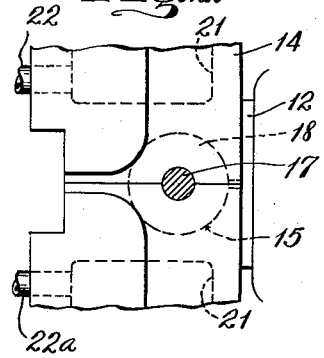
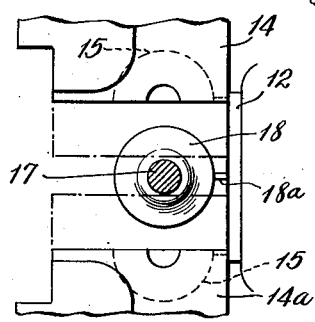
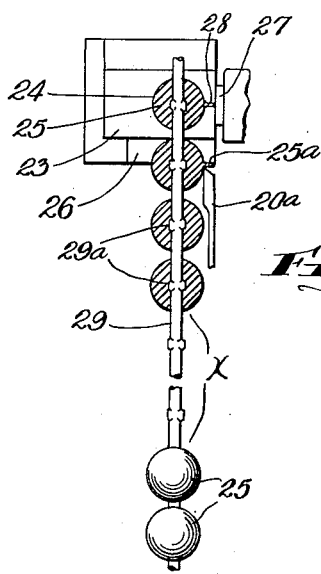
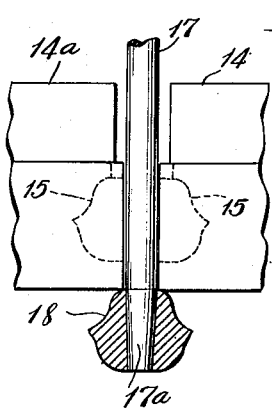
INVENTORS
DAVIS MARINSKY
LOUIS H. MORIN
BY
ATTORNEY Patented Dec. 11, 1934

1,983,558

UNITED STATES PATENT OFFICE 1,983,558

METHOD OF MOLDING OR DIE CASTING PREDETERMINED ARTICLES OF MANUFACTURE

Louis H. Morin and Davis Marinsky, New York, N. Y., assignors to Whitehall Patents Corporation, New York, N. Y., a corporation of New York Application December 7, 1933, Serial No. 701,291

15 Claims. (Cl. 22—200)

This invention relates to a process or method of molding or casting, and particularly, in the formation of predetermined bodies on a movable core in a successive series of casting operations; and the object of the invention is to provide a method whereby a series of articles of manufacture may be formed by suitable dies upon a core movable with respect to the dies and by means of which a finished casting may be moved out of the path of the dies to provide for the next successive casting operation and in some cases removed from the core to produce finished bodies or members, whereas, in other cases, the core may constitute a mounting or supporting body for the finished castings; a further object being to provide a method wherein two die parts are movable toward and from each other and held in firm engagement with each other and with a core disposed therebetween whereby casting or molding material injected into the mold chamber of the dies under pressure will form on that part of the core within the dies a predetermined article or device or part thereof; a further object being to provide a method of die molding or casting, which consists in intermittently forming upon a core member a successive series of castings wherein the core member is utilized as a means of feeding and spacing the castings on the core and with respect to the forming dies; and with these and other objects in view, the invention consists in a method of casting and molding articles of manufacture which is more fully hereinafter described and claimed.

The invention described and claimed herein is a continuation in part of application Serial Number 661,099 filed March 16, 1933 and application Serial Number 691,934 filed October 3, 1933 and of a companion application filed December 7, 1933 and bearing Serial Number 701,290, and is fully disclosed in the following specification, of which the accompanying drawing forms a part, in which the separate parts of the improvement are designated by suitable reference characters in each of the views, and in which:

Fig. 1 is a diagrammatic view illustrating the step of injecting molding material into the dies.

Fig. 2 is a sectional plan view of a part of the structure shown in Fig. 1.

Fig. 3 is a view similar to Fig. 1, showing the dies in a partially separated position.

Fig. 4 is a view similar to Fig. 1, showing the dies in the position shown in Fig. 3 and indicating another step in the method.

Fig. 5 is a front view of the dies as shown in Fig. 4 with part of the construction broken away and in section; and, Fig. 6 is a detail view of a modified form of article of manufacture and indicating the dies for producing the same.

In the prior applications and in the companion application hereinbefore referred to, the invention relates to a machine and/or method of producing a successive series of castings or moldings upon a mounting member or upon one edge of said member to produce, for example, what are known as the stringers of separable slide fasteners, whereas the method herein disclosed relates to the formation of independent articles of manufacture in a successive series of diecasting or molding operations upon a core, which is utilized as a means for ejecting the casting from the dies as well as a means of discharging the same from the machine or apparatus.

In some cases, the core may be utilized as a mounting member forming predetermined articles of manufacture, such for example, as a chain or string of beads, links or the like or in producing therefrom an article of manufacture, such for example, as a pull chain or wherein the core may be used simply as a convenient means of mounting, packing or shipping articles of manufacture. As far as machine elements are concerned, they may be consistent with the disclosures in the applications herein identified, and it will thus appear that the specific means for actuating the dies, applying pressure to the casting material, heating such material, feeding and actuating the core as well as the trimming tool form no direct part of this invention, and therefore, detail disclosure in this case is omitted.

In Fig. 1 of the drawing, we have indicated at 10 the gooseneck discharge of a container 10a for the casting or molding material indicated at 11. At 12, we have shown the discharge nozzle heated by an electric or other coil 13 to maintain the casting or molding material therein in fluid state during the operation of the apparatus in carrying out the method. At 14, 14a we have shown two die parts movable toward and from each other with a mold chamber 15 formed therebetween and a passage 16 adapted to register with the discharge passage 12a of the nozzle, whereby molding or casting material may be injected into the chamber 15 as indicated in Fig. 1 of the drawing.

Between the die parts 14, 14a in the construction shown in Figs. 1 to 5 inclusive is disposed a core member 17 which extends into the mold chamber 15 and upon which the cast or molded body 18 is formed. The end portion 17a of the core disposed within the mold chamber is tapered to a slight extent in order to permit removal of the body 18 therefrom. In the construction shown, the body 18 formed by the mold chamber 15 is in the form of a tubular knob of predetermined peripheral contour which may form an end piece to a pull chain or the knob or handle of a door, drawer or the like.

It will be understood at this time that the invention is not limited to the shape or form of the device formed by the method herein disclosed, nor is it limited to the arrangement or form of the core 17 disposed within the mold chamber, as this may be modified to suit various types of devices.

The lower surfaces of the die parts 14, 14a are fashioned as indicated at 19 to form a seat for the finished article 18 to support and brace the same thereon in the operation of severing the gate 18a therefrom by the shearing or trimming tool 20 in the manner indicated in Fig. 4 of the drawing. As seen in Fig. 2 of the drawing, the die parts 14 and 14a have chambers 21 into which cooling water or another cooling agent may pass to points adjacent the mold chamber 18 and be discharged therefrom by pipes 22, 22a, immediately after coming in contact with the hottest part of the dies. In this way, the dies are kept cool during the successive casting or molding operations.

In carrying the method into effect, it will be understood that the die parts 14, 14a are first brought into firm engagement with each other with the core 17 dsposed therebetween and are held in this position under pressure to prevent separation of the die parts, in the operation of injecting the casting material into the mold chamber 15 thereof. It will also appear that the nozzle 12 is constantly held in engagement with the outer surfaces of the die parts and this is preferably performed under sufficient pressure or sufficient tension to prevent separation of said parts in the casting operation.

When the dies are in closed position, the casting material 11 is forced by pressure, by any suitable means, through the gooseneck 10 and nozzle 12 into the chamber 15 through the passage 16. The die parts 14, 14a are then separated sufficiently to permit the downward movement of the core 17 including the cast body 18 therewith, it being understood in this connection that the core acts as a means for supporting the body 18 to eject from the die parts 14 and 14a. After moving downwardly into the position shown in Figs. 4 and 5, the die parts are partially closed as indicated in Figs. 3 and 5 to bring the lower surfaces of the dies upon the body 18. In this position, the tool 20 shears the gate 18a from the body 18 to produce the finished product. The seat 19 serves to brace and support the body 18 in addition to the support rendered by the core 17.

From the position of the parts shown in Figs. 4 and 5, the core 17 is now moved upwardly, discharging the body 18 therefrom into a suitable receiver, not shown, disposed therebeneath. In the upward movement, the core 17 returns to the position shown in Fig. 1, the die parts are again closed and the above cycle of operation repeated. In this way, it will be apparent that large quantities of molded or cast bodies may be intermittently produced through successive operations of the machine per minute, depending largely upon the particular casting produced and the speed at which it is found practical to operate the machine in the production of such castings.

In the above operation, it will be apparent that the cooling water or other medium is constantly circulated through the die parts 14, 14a to keep the dies cool, and at the same time, the nozzle 12 is kept heated by the coil 13, it being also apparent that the casting or molding material 11 employed is heated by suitable means such as disclosed in the companion cases referred to.

In Fig. 6 of the drawing, a slight modification is shown in which die parts 23 of the same general construction as the die parts 14, 14a are employed, only one half of the die being seen, and in this construction, the mold chamber 24 is spherical rather than of irregular contour to produce round or spherical molded or cast bodies 25, the dies 23 having seats 26 for supporting said bodies in the operation of trimming off the gates 25a thereof by the tool 20a. At 27, we have indicated a nozzle similar in all respects to the nozzle 12 through which the molding material is injected into the chamber 24 through a passage 28 forming the gate 25a. In this construction we have substituted for the core 17 a core 29 in the form of an elongated strip or strand of any desired cross sectional form and of any desired material, that is to say, the strand may be composed of a substantially rigid body of fibrous or metallic material or a flexible body of fibrous or metallic material. In some instances, it may be found preferable to include portions 29a thereon so spaced as to be disposed centrally of the body 25 to be molded on the core to form anchor members thereof, but the use of the anchor members is not absolutely essential, and this is especially true in casting the bodies 25 upon a core 29 having a roughened or porous surface.

In this connection, it will be understood that our invention is not limited to the formation of bodies 25 of any particular form or contour, as this is dependent solely upon the construction of the dies and the use intended for the resulting products, it being understood that this form of construction may be utilized in producing chains or a series of bodies upon a mounting strip or strand or merely as a convenient means of stacking, bundling or otherwise supporting formed bodies prior to the use thereof. It will also appear that suitable means may be employed for shifting the core 29 to space one group of bodies 25 from another group thereof on the core as is indicated at x in Fig. 6 of the drawing.

The method of forming devices shown in Fig. 6 of the drawing will be the same as that shown in the other figures excepting that the core 29 has a constant movement in one direction instead of a combination downward and forward movement as with the core 17 shown in the other figures, thus eliminating the stripping off operation previously referred to. All of the other steps of the method will, however, be the same.

It will be apparent that the method herein disclosed will lend itself to the production of articles of manufacture of various kinds and classes, both in using metallic molding or casting materials including various metal alloys employed in the art of diecasting and also to the art of forming moldings or castings in plastics including thermoplastics or in fact any type of molding or casting operations which do not require the cure period, it being apparent in this connection that in accordance with the method herein disclosed, the moldings or castings are formed at a relatively high rate of speed, the cast bodies being removed or ejected from the dies almost instantaneously after the formation thereof. In this connection, it will also be apparent that the particular type of core employed will depend entirely upon the desired product or body to be formed, it being apparent in this connection that two cores similar to the cores 17 and/or 29 could be employed.

It will be understood that various other changes in and modications of the method herein disclosed may be made within the scope of the appended claims without departing from the spirit of our invention or sacrificing its advantages.

Having fully described our invention, what we claim as new and desire to secure by Letters Patent, is:

1. The herein described method of forming a successive series of similar castings which comprises supporting relatively movable forming die parts into abutting relation with respect to each other with a core member disposed therebetween and entering the mold chamber of the die parts, moving the die parts toward and from each other in a horizontal plane and moving the core member in a plane vertically transversing the plane of movement of said die parts, introducing molding material into said die parts under pressure to form on that part of the core member within said mold chamber a cast body of predetermined contour, then separating the die parts to eject said body therefrom by said core, and then moving the core transversely of the die parts to feed the cast body out of alinement with the path of movement of the die parts to permit the next successive casting operation.

2. The herein described method of forming a successive series of similar castings which comprises supporting relatively movable forming die parts into abutting relation with respect to each other with a core member disposed therebetween and entering the mold chamber of the die parts, moving the die parts toward and from each other in a horizontal plane and moving the core member in a plane vertically transversing the plane of movement of said die parts, introducing molding material into said die parts under pressure to form on that part of the core member within said mold chamber a cast body of predetermined contour, then separating the die parts to eject said body therefrom by said core, then moving the core transversely of the die parts to feed the cast body out of alinement with the path of movement of the die parts to permit the next successive casting operation, said cast body including a gate, and then trimming the gate from said body to produce a finished product.

3. The herein described method of forming a successive series of similar castings which comprises supporting relatively movable forming die parts into abutting relation with respect to each other with a core member disposed therebetween and entering the mold chamber of the die parts, moving the die parts toward and from each other in a horizontal plane and moving the core member in a plane vertically transversing the plane of movement of said die parts, introducing molding material into said die parts under pressure to form on that part of the core member within said mold chamber a cast body of predetermined contour, then separating the die parts to eject said body therefrom by said core, then moving the core transversely of the die parts to feed the cast body out of alinement with the path of movement of the die parts to permit the next successive casting operation, said cast body including a gate and then trimming the gate from said body to produce a finished product, and then removing the core from said body and repositioning the same between the die parts for the next successive casting operation.

4. The herein described method of forming a successive series of similar castings which comprises supporting relatively movable forming die parts into abutting relation with respect to each other with a core member disposed therebetween and entering the mold chamber of the die parts, moving the die parts toward and from each other in a horizontal plane and moving the core member in a plane vertically transversing the plane of movement of said die parts, introducing molding material into said die parts under pressure to form on that part of the core member within said mold chamber a cast body of predetermined contour, then separating the die parts to eject said body therefrom by said core, then moving the core transversely of the die parts to feed the cast body out of alinement with the path of movement of the die parts to permit the next successive casting operation, said cast body including a gate and then trimming the gate from said body to produce a finished product, then removing the core from said body and repositioning the same between the die parts for the next successive casting operation, and circulating a cooling agent through the die parts at a point adjacent the mold chamber therein.

5. The herein described method of forming a successive series of similar castings which comprises supporting relatively movable forming die parts into abutting relation with respect to each other with a core member disposed therebetween and entering the mold chamber of the die parts, moving the die parts toward and from each other in a horizontal plane and moving the core member in a plane vertically transversing the plane of movement of said die parts, introducing molding material into said die parts under pressure to form on that part of the core member within said mold chamber a cast body of predetermined contour, then separating the die parts to eject said body therefrom by said core, then moving the core transversely of the die parts to feed the cast body out of alinement with the path of movement of the die parts to permit the next successive casting operation, firmly supporting an ejection nozzle in constant engagement with the die parts and heating the nozzle to retain the molding material in fluid state therein.

6. The herein described method of forming molded bodies of the class described which consists in providing an elongated core member, intermittently moving die parts toward and from each other and said core member with a part of said core member disposed within the mold chamber of the die parts, moving the core member when the die parts are separated transversely with respect to said die parts to position a successive series of spaced portions of the core between the die parts to form a successive series of molded bodies thereon, and then forcing molding material under pressure into the mold chamber of the die parts when successively brought into closed position on the successive series of spaced portions of the core in forming successive series of molded bodies arranged longitudinally of said core.

7. The herein described method of forming molded bodies of the class described which consists in providing an elongated core member, intermittently moving die parts toward and from each other and said core member with a part of said core member disposed within the mold chamber of the die parts, moving the core member when the die parts are separated transversely with respect to said die parts to position a successive series of spaced portions of the core between the die parts to form a successive series of molded bodies thereon, then forcing molding material under pressure into the mold chamber of the die parts when successively brought into closed position on the successive series of spaced portions of the core in forming successive series of molded bodies arranged longitudinally of said core, and moving said core to space said successive series of bodies in groups thereon.

8. The herein described method of forming molded bodies of the class described which consists in providing an elongated core member, intermittently moving die parts toward and from each other and said core member with a part of said core member disposed within the mold chamber of the die parts, moving the core member when the die parts are separated transversely with respect to said die parts to position a successive series of spaced portions of the core between the die parts to form a successive series of molded bodies thereon, forcing molding material under pressure into the mold chamber of the die parts when successively brought into closed position on the successive series of spaced portions of the core in forming successive series of molded bodies arranged longitudinally of said core, and trimming the molded bodies to a finished size.

9. The method of diecasting cored bodies which comprises arranging a core within the mold chamber of opposed die parts movable toward and from each other in a horizontal plane, injecting casting material into the mold chamber under pressure to form a die casting on that part of the core within said mold chamber, holding the core stationary in separating the dies to eject the casting therefrom, then moving the core in a vertical transverse plane with respect to the plane of movement of the die parts to position the formed casting out of the path of movement of the die parts to permit the formation of the next successive casting on said core.

10. The method of diecasting cored bodies which comprises arranging a core within the mold chamber of opposed die parts movable toward and from each other in a horizontal plane, injecting casting material into the mold chamber under pressure to form a die casting on that part of the core within said mold chamber, holding the core stationary in separating the dies to eject the casting therefrom, then moving the core in a vertical transverse plane with respect to the plane of movement of the die parts to position the formed casting out of the path of movement of the die parts to permit the formation of the next successive casting on said core, and supporting an electrically heated nozzle for injecting the casting material into the mold chamber of the die parts in constant engagement with said die parts.

11. The herein described method of forming a successive series of molded bodies on an elongated member of freely flexing material which comprises intermittently moving single impression die parts toward and from longitudinally spaced sections of said member while intermittently moving said member transversely with respect to the path of movement of the die parts in the longitudinal plane of said member, securely supporting the die parts together and upon the sections of said member in the successive molding positions of the die parts with a part of said member in the impression thereof, and simultaneously introducing molding material under pressure into the impression of the die parts and around said member in forming molded bodies on the part of said member within the impression.

12. The herein described method of forming a successive series of molded bodies on an elongated member of freely flexing material which comprises intermittently moving single impression die parts toward and from longitudinally spaced sections of said member while intermittently moving said member transversely with respect to the path of movement of the die parts in the longitudinal plane of said member, securely supporting the die parts together and upon the sections of said member in the successive molding positions of the die parts with a part of said member in the impression thereof, simultaneously introducing molding material under pressure into the impression of the die parts and around said member in forming molded bodies on the part of said member within the impression, and intermittently feeding said member relatively to the die parts to space the molded bodies in groups on said member.

13. In the art of forming metallic die castings, the method of forming a successive series of castings which comprises intermittently moving die parts toward and from each other in a fixed horizontal plane, supporting a core within the mold chamber of the die parts when in closed position, injecting molten metal under pressure into the mold chamber of the die parts to form a casting on said core, then moving the core in a transverse vertical plane with respect to the path of movement of the die parts when the same are in open position, and repositioning the core between the die parts in returning the same to closed position for the next successive casting operation.

14. In the art of forming metallic die castings, the method of forming a successive series of castings which comprises intermittently moving die parts toward and from each other in a fixed horizontal plane, supporting a core within the mold chamber of the die parts when in closed position, injecting molten metal under pressure into the mold chamber of the die parts to form a casting on said core, then moving the core in a transverse vertical plane with respect to the path of movement of the die parts when the same are in open position, repositioning the core between the die parts in returning the same to closed position for the next successive casting operation, and introducing the molten metal into the mold chamber of the die parts through a heated nozzle firmly held in constant engagement with said die parts.

15. In the art of forming metallic die castings, the method of forming a successive series of castings which comprises intermittently moving die parts toward and from each other in a fixed horizontal plane, supporting a core within the mold chamber of the die parts when in closed position, injecting molten metal under pressure into the mold chamber of the die parts to form a casting on said core, then moving the core in a transverse vertical plane with respect to the path of movement of the die parts when the same are in open position, repositioning the core between the die parts in returning the same to closed position for the next successive casting operation, and circulating a cooling agent through the die parts adjacent the mold chamber formed therebetween to chill the molten metal injected into said chamber.

LOUIS H. MORIN.
DAVIS MARINSKY.